Patented May 7, 1929.

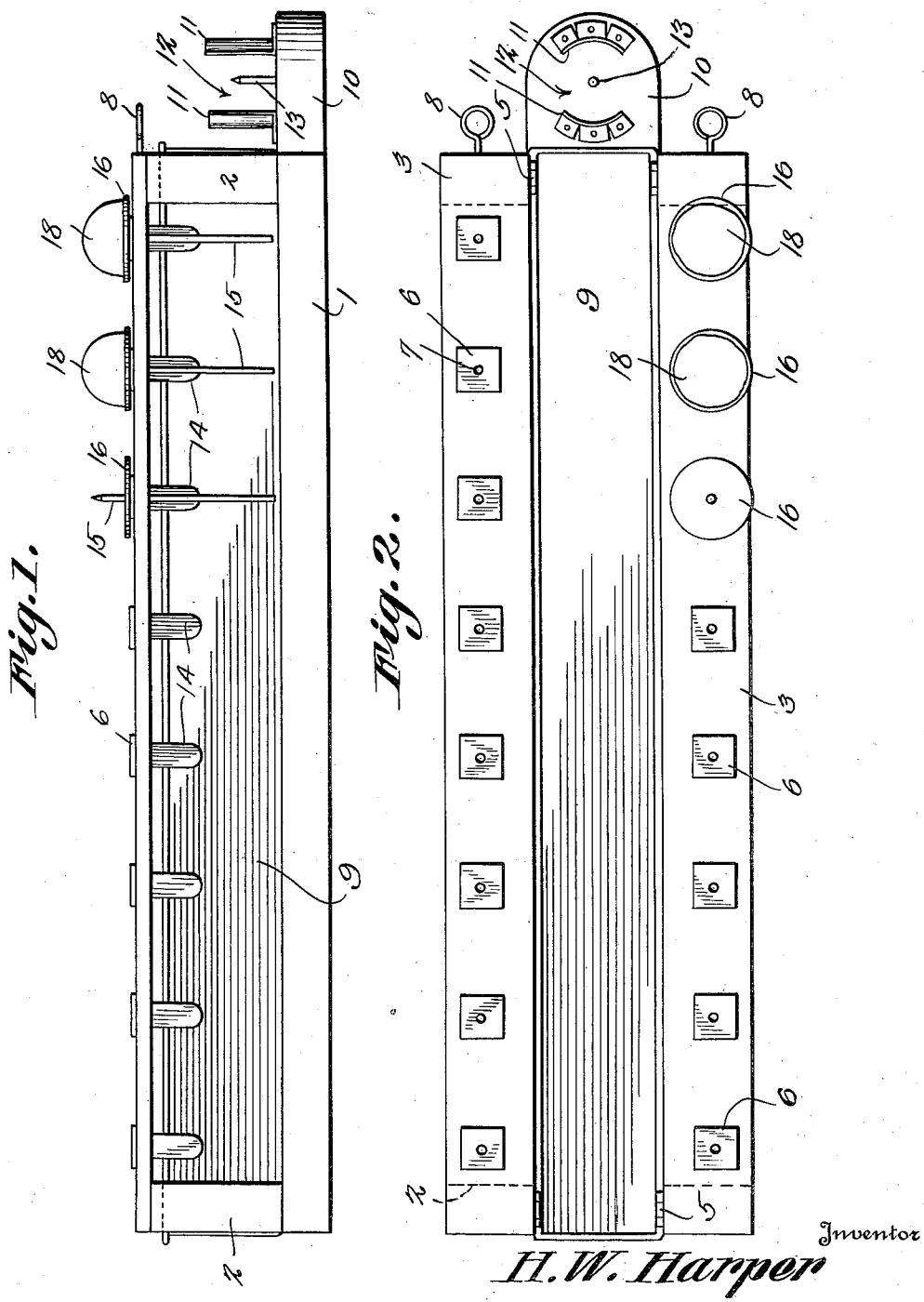

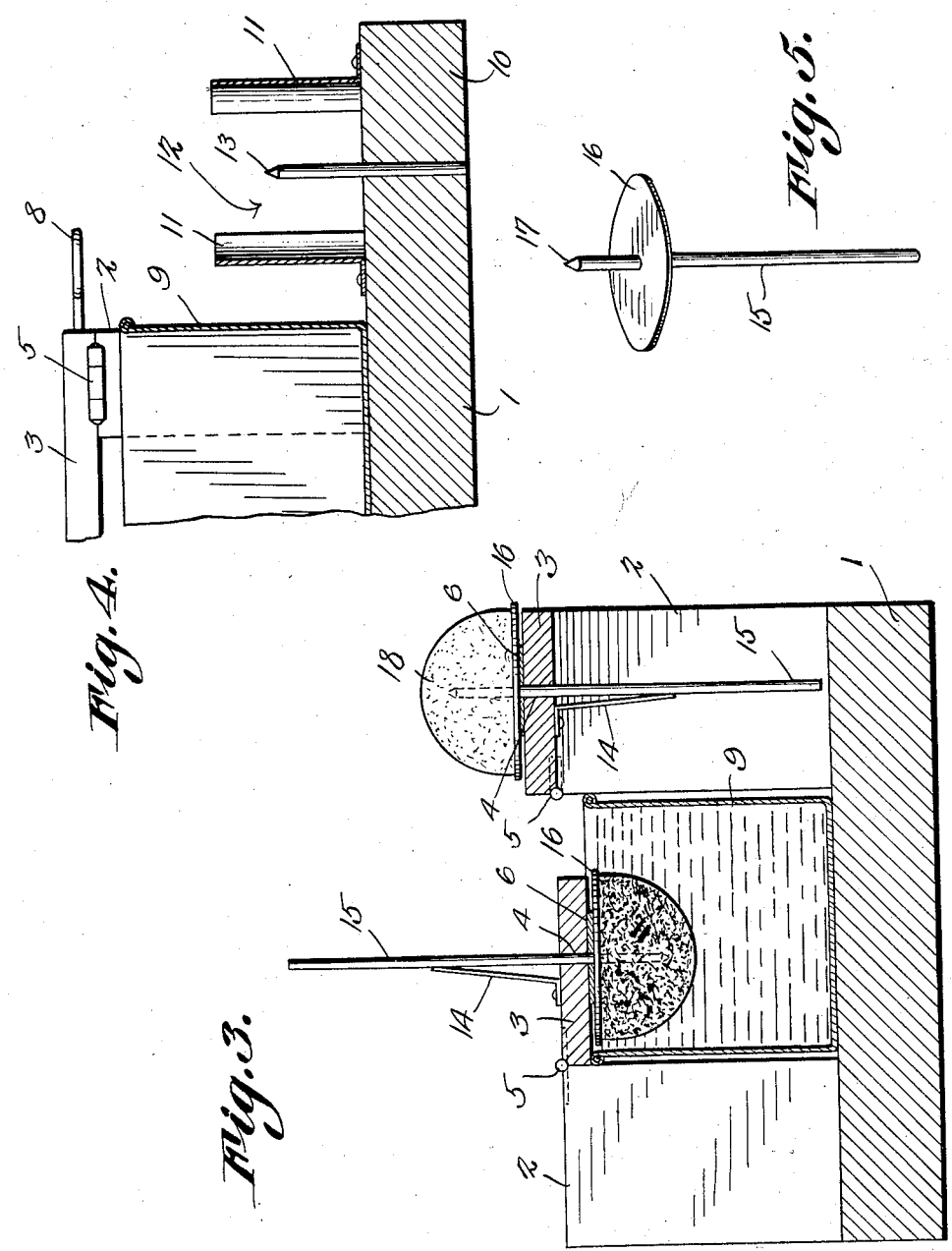

1,711,599

UNITED STATES PATENT OFFICE.

HOBART W. HARPER, OF LA CROSSE, KANSAS.

APPARATUS FOR COATING CONFECTIONS.

Application filed July 26, 1927. Serial No. 208,642.

This invention relates to apparatus designed primarily for coating portions of ice cream or other frozen confections although it is to be understood that it can also be used for coating confections that are not frozen.

It is an object of the invention to provide a means whereby a number of articles can be dipped simultaneously into the coating material and thereafter removed simultaneously to harden or dry.

A further object is to provide a structure of this character which is simple in construction, easy to manipulate and permit rapid production of the coated confection.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a side elevation of the apparatus some of the confections to be coated being shown in position thereon.

Figure 2 is a top plan view of the structure shown in Figure 1.

Figure 3 is an enlarged vertical transverse section showing one confection inverted during the coating operation and another confection ready to be inverted.

Figure 4 is a vertical longitudinal section on an enlarged scale through one end portion of the apparatus showing the disk holding and centering means.

Figure 5 is a perspective view of one of the confection holders.

Referring to the figures by characters of reference 1 designates a base of any suitable material provided, near its ends, with standards 2 on which are mounted parallel spaced strips 3 each provided with a longitudinal series of spaced apertures 4. These strips 3 are connected to the standard 2 by hinges 5 and the strips normally rest on the standards. Spacing gaskets or washers 6 are secured to one face of each of the strips 3 and have openings 7 therein registering with the openings 4. These gaskets may be held to the strips 3 by an adhesive or by any other suitable means. Each strip is preferably provided with a handle 8 by means of which it can be readily moved into or out of position upon the standards 2.

Interposed between the standards is an elongated tank 9 adapted to hold coating material. This tank terminates below the normal level of the strip 3 and is so located that when either of these strips is swung to inverted position, said strip will overhang the tank and rest thereon as shown at the left of Figure 3.

One end of the base 1 has an extension 10 provided with spaced upstanding arcuate members 11 forming between them a disk receiving pocket 12. Extending upwardly within this pocket at the center thereof is a centering prong 13.

Extending from each of the strips 3 so as to depend therefrom when the strips are resting on the standards 2, are series of gripping springs 14. These springs are designed to bear against and frictionally hold small sticks 15 insertible through the openings 4 and 7 and also extending through disks 16 are paraffined paper or the like which are held frictionally on the sticks. The upper ends of the sticks are preferably pointed as shown at 17. The pressure of the springs serves to bind the sticks upon opposed portions of the walls of the openings in which they are seated so that they are thus held securely against displacement.

One of these sticks with a disk 16 thereon is adapted to be inserted into each of the openings 7 and the openings 4 thereunder so that the disk will rest on the spacing washer or gasket 6 while the sticks 15 will be frictionally engaged by the springs 14. After the sticks have been placed in one of the strips 3 with the disk 16 located at the side, ice cream is placed on the upper ends of the sticks and the disks surrounding them, an ice cream dipper or scoop of standard size being used for this purpose. Thus all of the portions of ice cream mounted on the series of disks will be of the same size. A coating material such as thick chocolate or the like is contained in the tank 9. After the ice cream has been distributed over the series of disks on one of the strips 3 said strip is swung to an inverted position so as to bring the ice cream into the contents of the tank 9. Immediately thereafter the strip 3 is swung back to normal position on the standards 2 and the coating material allowed to harden. During this dipping operation and hardening operation additional portions of ice cream are placed on the disks 16 and 15 carried by the other strip 3. Thus the two strips can be operated alternately, a series of confections being dipped at each operation.

The confection, after being dipped and after the coating has hardened, can be sold to customers or can be stored in a cold place for preservation.

The pocket 12 is designed to hold a supply of disks, these disks being centered by prong 13.

By providing the springs 14 the confections are prevented from slipping downwardly too far into the contents of the tank 9 during the dipping operation. The spacing members 6 serve to prevent the coating material from adhering to the strips.

In the drawing the portions of ice cream on the disks 16 have been indicated at 18.

What is claimed is:

The combination with a base, and upstanding supporting means thereon at the sides thereof, of a tank supported by the base between said upstanding means, oppositely disposed strips hingedly connected to said supporting means and separately insertable to position over the tank, there being a longitudinal series of apertures in each of the strips, yielding retaining means supported in an inclined position adjacent each of the apertures, sticks insertable through the respective apertures into frictional engagement with the ends of the retaining means, said means pressing the sticks laterally to bind them against opposed portions of the wall of the aperture in which they are seated, confection supporting disks carried by the sticks, spacing devices on each strip for holding the disks away from the strips, said sticks and disks being invertible with the strip thereby to support an engaged confection within the tank, and a disk holding pocket on the base beyond one end of the tank, said pocket including opposed upstanding walls and a centering pin.

In testimony that I claim the foregoing as my own, I have hereto affixed my signature.

HOBART W. HARPER.